Feb. 20, 1951 C. P. YOUNG 2,542,445
FISHING TOOL
Filed Aug. 20, 1946 4 Sheets-Sheet 1
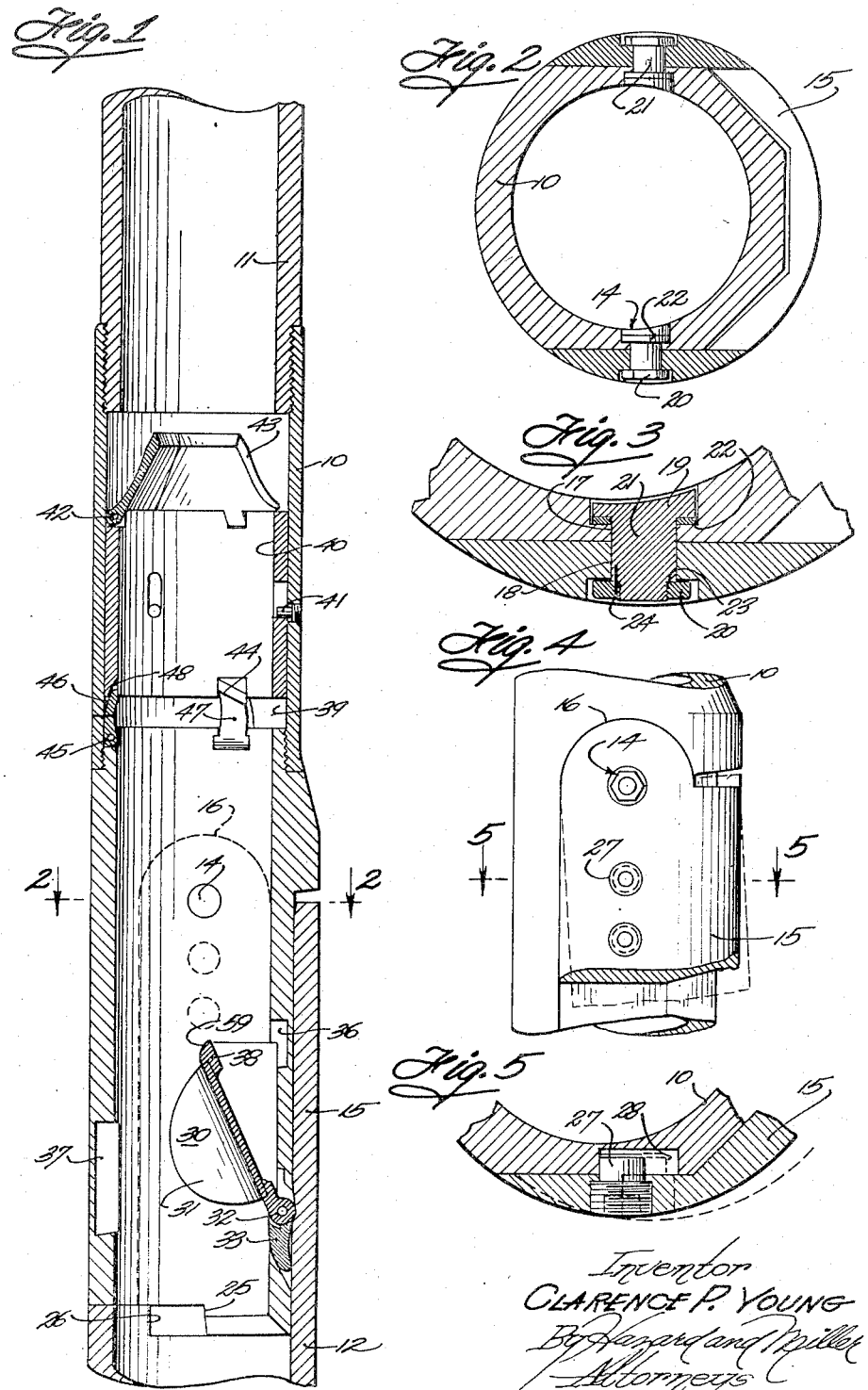
Inventor
CLARENCE P. YOUNG
By Hazard and Miller
Attorneys Feb. 20, 1951 C. P. YOUNG 2,542,445
FISHING TOOL
Filed Aug. 20, 1946 4 Sheets-Sheet 2
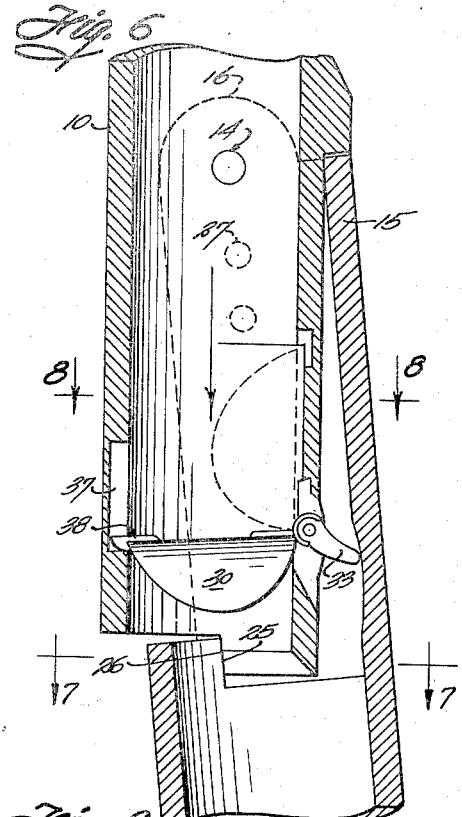
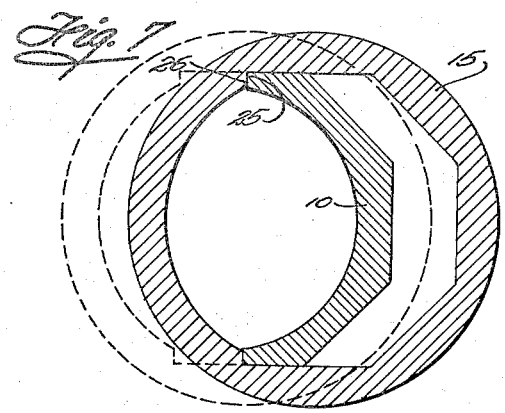
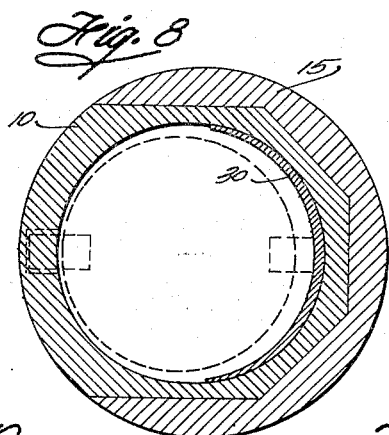
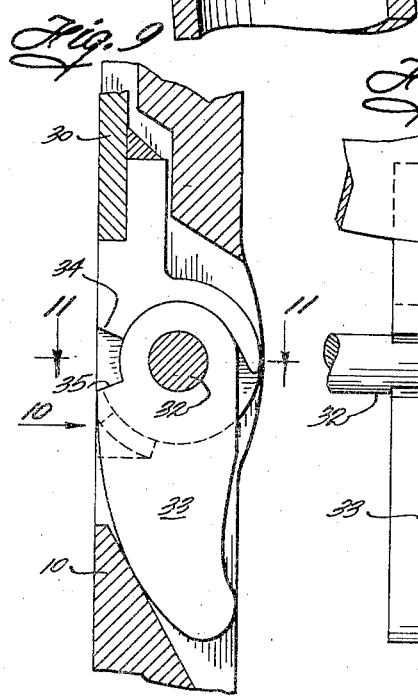
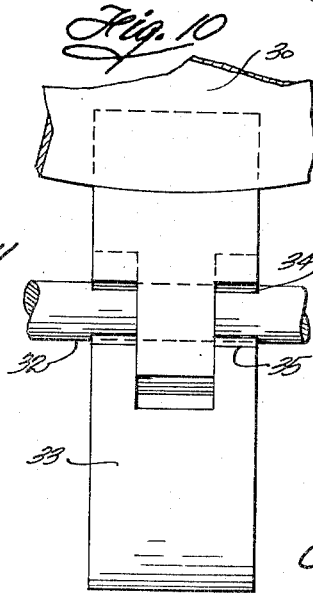
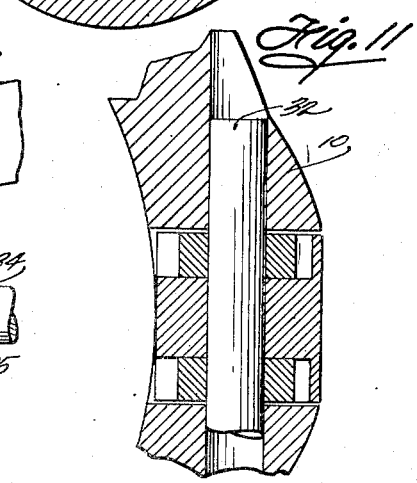
Inventor
CLARENCE P. YOUNG
By Hazard and Miller
Attorneys Feb. 20, 1951            C. P. YOUNG            2,542,445
FISHING TOOL
Filed Aug. 20, 1946            4 Sheets-Sheet 3
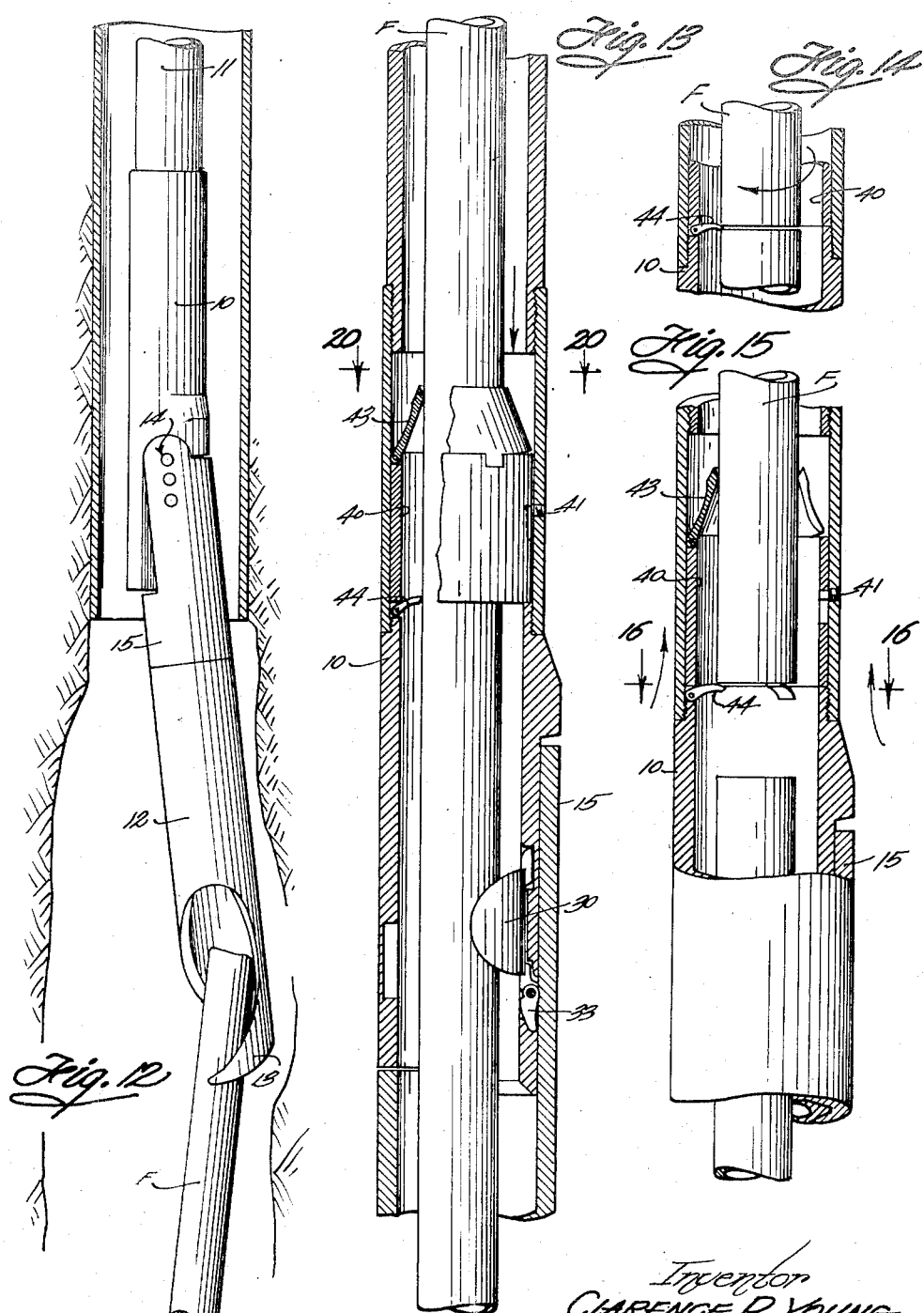

Feb. 20, 1951 C. P. YOUNG 2,542,445
FISHING TOOL
Filed Aug. 20, 1946 4 Sheets-Sheet 4
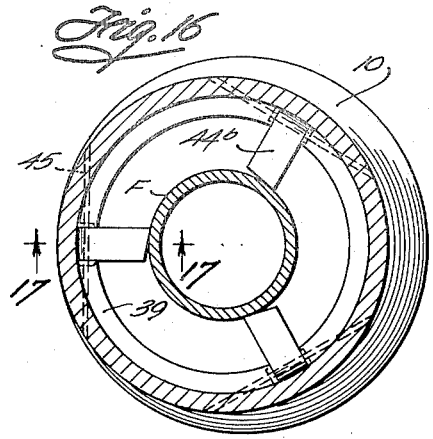
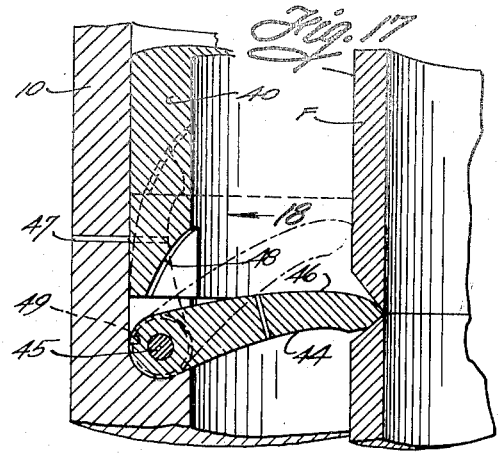
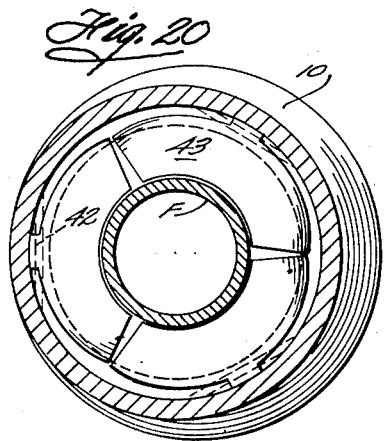
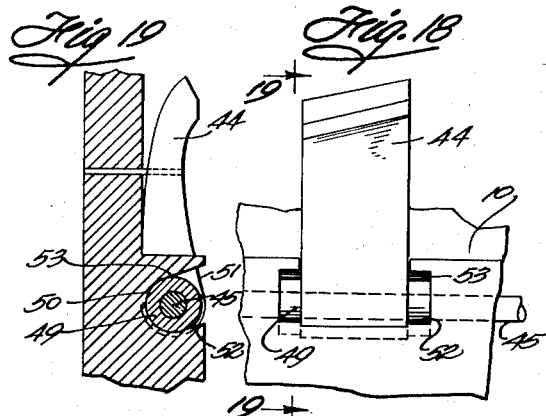
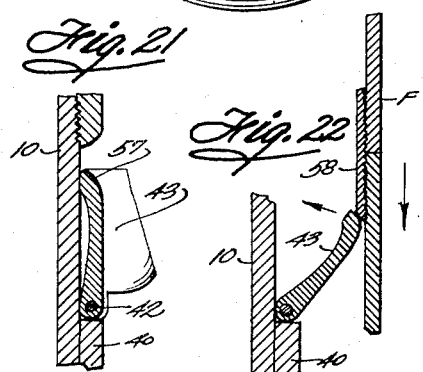
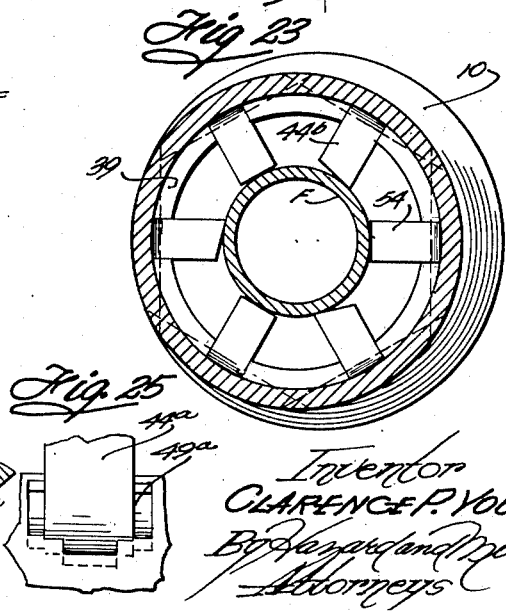
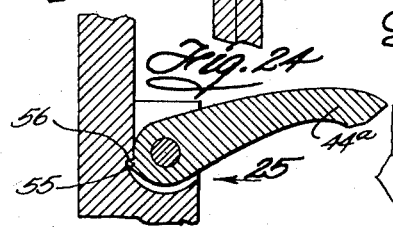
Inventor
CLARENCE P. YOUNG
By Hazard and Miller
Attorneys Patented Feb. 20, 1951

2,542,445

UNITED STATES PATENT OFFICE 2,542,445

FISHING TOOL

Clarence P. Young, Bellflower, Calif.

Application August 20, 1946, Serial No. 691,744

12 Claims. (Cl. 294—86)

This invention relates to improvements in fishing tools such as are used to recover lost pipe in wells, and particularly relates to that type of fishing tool wherein there is a body adapted to be lowered into a well having a hydraulically actuated arm adapted to be swung laterally relative to the body so that on rotating the run-in string of pipe the arm will be swung adjacent the well walls to encounter and engage the lost string that may be leaning thereagainst.

Heretofore, fishing tools of this general character have been devised but difficulties have been experienced with their use in that the pivotal connection between the arm and the body was apt to become damaged or placed under such severe strain that binding was apt to occur that would interfere with the proper operation of the arm.

One object of the present invention therefore is to provide an improved fishing tool of this character wherein the pivotal connection between the arm and the body is such that it is adequately protected and danger of binding is eliminated.

Another object of the invention is to provide a superior means of limiting or stopping outward swinging movement of the arm so that when the outward movement is limited the pivotal connection between the arm and the body will not be damaged.

Another object of the invention is to provide a novel, simple, and superior means for hydraulically actuating the arm by means of the circulation fluid that can be forced down through the run-in string of pipe and which is so designed that it does not interfere with the body of the tool being lowered over the lost string of pipe that is to be recovered.

Another object of the invention is to provide a fishing tool consisting of a body having a hydraulically actuated arm that is adapted to be swung laterally with respect thereto to engage a lost string of pipe in a well and which when the lost string has been recovered can be lowered over the string and a suitable length of the string cut off in the event that the string cannot be pulled from the well.

Heretofore, fishing tools have been provided consisting of tubular bodies adapted to be lowered over lost strings of pipe in a well and which have releasable cutters adapted to be released to cut off a portion of the lost string, the cutters then serving as supports for elevating the cut off portion after it has been severed from the remainder. Many tools of this general character have been designed but have presented difficulties in that the load of cut off portion when imposed upon the cutters has been so great that the cutters are apt to shear off their hinge pins by which they are hingedly mounted on the body.

It is, therefore, another object of the present invention to provide a tool of this character wherein the cutters are so mounted on the body that they may pivot relatively thereto but when they have severe loads imposed thereon as may be occasioned by the elevating of the severed portion of the pipe there is no danger of the cutters shearing their hinge pins.

A further object of the invention is to provide a novel means for actuating or releasing the cutters which is controllable from the surface and which will enable withdrawal of the tool from over the lost string of pipe and over the collars thereon in the event that the pipe cannot be cut or cannot be pulled from the well.

With the foregoing and other objects in view, which will be made manifest in the following detailed description and specifically pointed out in the appended claims, reference is had to the accompanying drawings for an illustrative embodiment of the invention, wherein:

Figure 1 is a partial view in vertical section of the improved fishing tool illustrating the body of the fishing tool and the upper portion of its swingable arm in that position in which it is to be lowered into the well to recover a lost string of pipe;

Fig. 2 is a sectional view taken substantially upon the line 2—2 upon Fig. 1;

Fig. 3 is an enlarged sectional view of a portion of the construction shown in Fig. 2;

Fig. 4 is a partial view in side elevation illustrating the pivotal connection between the arm and the body of the tool;

Fig. 5 is a horizontal section taken substantially upon the line 5—5 upon Fig. 4;

Fig. 6 is a partial view in vertical section similar to Fig. 1, but illustrating the arm as having been swung outwardly relatively to the body;

Fig. 7 is a horizontal section taken substantially upon the line 7—7 upon Fig. 6;

Fig. 8 is a horizontal section taken substantially upon the line 8—8 upon Fig. 6;

Fig. 9 is an enlarged view in vertical section illustrating the details of the connection between the flapper and the arm actuator that actuates the arm;

Fig. 10 is a view in elevation taken substantially in the direction of the arrow 10 upon Fig. 9;

Fig. 11 is a horizontal section taken substantially upon the line 11—11 upon Fig. 9;

Fig. 12 is a sectional view through a well illustrating the tool embodying the present invention as having engaged a lost string of pipe that is to be recovered;

Fig. 13 is a vertical section through the improved tool illustrating it as having been lowered over the lost string of pipe and prepared to cut a portion thereof;

Fig. 14 is a partial view in vertical section illustrating the pipe in the process of being cut;

Fig. 15 is a sectional view illustrating the pipe as having been cut and in the process of elevating the cut section from the well;

Fig. 16 is a horizontal section taken substantially upon the line 16—16 upon Fig. 15;

Fig. 17 is a sectional view on an enlarged scale taken substantially upon the line 17—17 upon Fig. 16;

Fig. 18 is a partial view taken in the direction of the arrow 18 on Fig. 17, illustrating one of the cutters;

Fig. 19 is a vertical section taken substantially upon the line 19—19 upon Fig. 18;

Fig. 20 is a horizontal section taken substantially upon the line 20—20 upon Fig. 13;

Fig. 21 is a sectional view illustrating one of the closure-forming members that is adapted to form a closure about the lost string of pipe to enable the cutters to be hydraulically actuated or released;

Fig. 22 is a sectional view illustrating the closure member in a position engaging the lost string and illustrating the manner in which it may be passed over a collar thereon in the event that it is desired to withdraw the tool from the well without recovering the lost string of pipe;

Fig. 23 is a view similar to Fig. 16, but illustrating a slightly modified form of construction; and Figs. 24 and 25 are views similar to Figs. 19 and 18, respectively, but illustrating a slightly modified form of construction.

Referring to the accompanying drawings wherein similar reference characters designate similar parts throughout, the improved fishing tool comprises a body 10 adapted to be lowered into a well by means of a run-in string of pipe 11 to recover a lost string of pipe or fish F. This body is tubular and is of such internal diameter as to be capable of being lowered over the fish F with necessary clearance. A tubular arm 12 having a finger 13 on its lower end is pivotally mounted at 14 to the body so that it may be swung laterally with respect thereto. This tubular arm has a somewhat semi-cylindrical shaft extension 15 disposed about the lower end of the body providing ears 16 by which it is pivotally connected to the sides of the body.

A feature of the present invention concerns the pivotal connection between the arm and the body and the arrangement of the stop which limits its outward swinging movement. Aligned apertures 17 and 18 are formed in the sides of the body and in the ears respectively. These apertures have enlargements adapted to receive the heads 19 and the nuts 20 of the pivot bolts 21 so that the heads and the nuts will be completely recessed in the body and the arm respectively. Gaskets 22 are positioned between the heads 19 and the body to prevent circulation fluid from leaking around the pivot pins or bolts 21 and cutting out the metal of the body and the arm around the bolts. The bolts have shoulders 23 formed thereon against which the nuts 20 are tightened and after being tightened the nuts are pinned in place as by pins 24. By this construction it will be noted that the nuts 20 are tightened against the outer sides of the ears 16 and consequently the ears are at all times free to swing relatively to the body without binding. At the bottom of the body there are arranged shoulders 25 that are engageable by shoulders 26 on the top of the tubular portion of the arm. These shoulders on mutual engagement serve to limit outward swinging of the arm relative to the body and as they are disposed somewhat remote from the pivot pins 21 they may limit the swinging movement of the arm without imposing severe strains on the pivot pins.

On the sides of the upper end of the arm there are studs 27 the inner ends of which fit in horizontally disposed arcuate recesses 28 on the sides of the body. These studs function as load-carrying pins cooperating with the pivot pins 21 in swingably suspending the arm from the body. The slots 28 are somewhat longer than the length of travel of the studs 27 so that they will not function as stops limiting the swinging movement of the arm. The sole purpose of these studs is to assist in carrying the load of the arm on the body 10.

A novel, simple, and advantageous means for hydraulically actuating the arm to swing it outwardly relative to the body is provided which will not interfere with the lowering of the body over the fish F. This consists of a flapper 30 the sides of which are bent downwardly as indicated at 31 and which is pivotally mounted on a hinge pin 32 in the wall of the body. Associated with this flapper is an arm actuator or crank 33 that is pivotally mounted for rotation on the same hinge pin 32. There is a lost motion between the flapper and the arm actuator as is illustrated in detail in Fig. 9. On the flapper there is a shoulder or abutment 34 that as the flapper rotates is engageable with an abutment or shoulder 35 on the arm actuator, and when the flapper is swung downwardly into the position shown in Fig. 6 these shoulders engage and swing the arm actuator 33 outwardly so that it projects outwardly beyond the sides of the body to engage the interior of the extension on the arm and thus swing the arm outwardly about its pivot 14. The lost motion provided by these mutually engageable shoulders 34 and 35 permits the flapper 30 to assume a normal position inclined inwardly in the body as shown in Fig. 1, without involving a swinging of the actuator 33 outwardly beyond the sides of the body. Recesses 36 and 37 are formed in the body the recess 36 accommodating the upper end of the flapper which is reenforced as at 38. When the flapper is swung into fully open position the recess 37 provides a seat for this reenforcement when the flapper has been swung into fully closed position or horizontal position as illustrated in Fig. 6. It will thus be appreciated that when the flapper is in the normal position shown in Fig. 1 on forcing circulation fluid downwardly through the run-in string 11 the circulation fluid will engage the inwardly projecting flapper and force it downwardly into the position shown in Fig. 6, thus swinging the arm outwardly. However, when the fish F has been engaged and the body is then lowered thereover the flapper may assume a fully open position within the body as is illustrated in Fig. 13. The lost motion between the flapper and the actuator enables the flapper to assume either the position shown in Fig. 13 or the position shown in Fig. 1, wherein it may be encountered by the circulation fluid without involving a movement of the actuator 33.

When the arm has thus been swung laterally with relation to the body or into a position shown in Fig. 12, the run-in string of pipe 11 may be rotated to swing the end of the arm adjacent the well walls so that the finger 13 may engage the upper end of the lost string F and so relate the arm 12 with relation to the fish that the tool may be lowered thereover. The finger 13 on the interior of the arm 11 may be equipped with slips if desired to engage the fish and to pull it from the well in the event that it has not become frozen or immovably lodged therein by the settling of mud or debris thereabouts. However, as such slips on arms of this character are old in the art they have not been illustrated herein.

In the event that the fish F cannot be bodily withdrawn from the well, the arm and the body are lowered thereover and during such lowering movement the flapper 30 may be swung into the fully open position as is illustrated in Fig. 13. In the upper end of the body above the flapper 30 the body is internally enlarged as indicated at 39 and within this enlarged portion there is a slidable sleeve 40 which is guided for vertical movement by studs 41. On the upper end of this sleeve there are hingedly mounted such as by hinge pins 42 closure-forming elements 43 which are adapted to mutually cooperate in forming a partial closure around the fish F as illustrated in Fig. 13. These closure-forming elements are preferably in the form of conical segments which when the body is empty as illustrated in Fig. 1, merely lie adjacent each other with a relatively large opening arranged between them so as not to interfere with the downward flow of circulation fluid required to actuate the flapper 31. Below the sleeve 40 a plurality of cutters is arranged. Each cutter 44 is recessed in the walls of the body and is hingedly connected thereto as by hinge pins 45. The upper ends of the cutters are curved inwardly as indicated at 46 to be engageable by cam surfaces 48 on the bottoms of the sleeves. The cutters are initially retained in their fully open position by means of shear or tension pins 47. When the fish has been introduced into the body as illustrated in Fig. 13 fluid pressure may be applied to the tops of the closure-forming elements 43 by the forcing of the fluid downwardly through the run-in string of pipe. As the closure-forming elements form substantially a complete closure around the fish this pressure is effective to force the sleeve 40 downwardly camming the cutters 44 inwardly and breaking their shear or tension pins 47. These cutters are of such length as to engage the fish and on rotation of the body by the run-in string of pipe the cutters may be caused to cut through the upper portion of the fish ultimately swinging beneath the cut off or severed portion to function as supports by which the severed portion may be lifted as illustrated in Fig. 15.

Heretofore, attempts have been made to provide tools of this character with cutters which on cutting through the pipe function as elevators for elevating it. However, these have generally proven objectionable due to the fact that the severe loads imposed on the cutters by the severed portion of the piece of pipe are effective to shear off the hinge pins 45. A feature of the present invention resides in the details of construction of the cutters to protect the hinge pins so that they will not be sheared when subjected to these extreme loads. To this end each of the cutters is equipped at its sides with relatively heavy bosses or trunnions 49 which are integral with the cutters and which rotate against semi-cylindrical surfaces 50 in the backs of recesses in the walls of the body. Downward swinging movement of the cutters is limited by the under-surfaces 51 engaging shoulders 52 and when the load is imposed on the ends of the cutters the cutters are supported inwardly of the hinge pins by means of the shoulders 52 while the trunnions 49 bear upwardly on the surfaces 53. Thus the load is not transmitted to the hinge pins and danger or shearing the hinge pins is avoided.

In some forms of construction there may be merely three cutters 44b but where the loads may be extremely heavy idler members 54 which are similar in construction to the cutters and which are similarly mounted on the body may be located between the cutters. These idlers are not equipped with cutting edges and merely travel in the path of the cutters during the rotation. When the cut is completed however these idlers drop inwardly beneath the severed portion of the pipe and cooperate with the cutters in supporting it. The idlers preferably are equipped with trunnions and recesses similar to those illustrated in Figs. 18 and 19 so that they will be capable of carrying the load without danger of shearing their hinge pins.

In Figs. 24 and 25 a slight modification of cutter construction is illustrated wherein the cutter 44a has at its sides the trunnions 49a which bear in recesses at the sides of the recess that accommodates the cutter. In this form of construction downward swinging movement of the cutter may be limited by means of a finger 55 that is engageable with a shoulder 56 on the body wall. Consequently, in this form of construction when the load is imposed upon the cutter it is taken by the trunnions and the mutually engageable shoulders 55 and 56 so that no load is placed upon the hinge pins.

As illustrated in Figs. 21 and 22, the upper ends of the closure-forming elements 43 are beveled off as indicated at 57 so that in the event that these closure-forming elements pass downwardly over a collar 58 on the fish F and it is desired to withdraw the tool from over the fish the closure-forming elements will cam themselves outwardly and thus permit the collar 58 to descend therebetween. In a similar manner the end of the flapper is rounded and cammed as at 59 so that the flapper will not interfere with the withdrawal of the tool from over the fish.

From the above-described construction it will be appreciated that a highly improved fishing tool is provided which enables the fish to be located and engaged in the well and the tool to be lowered thereover. Cutters may then be hydraulically released and caused to engage the fish to sever and withdraw a portion of it. In the improved tool the hinge or swingable connection between the arm and the body is adequately protected and cutters are likewise adequately protected even though these parts are subjected to severe strains.

Various changes may be made in the details of construction without departing from the spirit and scope of the invention as defined by the appended claims.

I claim:

1. In a tool of the class described, a tubular body adapted to be lowered into a well, an arm swingably mounted upon the body, means operable by forcing fluid downwardly through the body for swinging said arm laterally, cutting means disposed within the body, means for forming at least a partial closure around a fish over which the body is lowered, and means operable by forcing fluid downwardly against the closure for actuating the cutting means to cause it to engage and cut a fish upon rotation of the body.

2. In a tool of the class described, a tubular body adapted to be lowered into a well over a fish, cutting means on the interior of the body, means for forming at least a partial closure within the body around the fish, and means operable by forcing fluid downwardly against the closure for actuating the cutting means.

3. In a tool of the class described, a tubular body adapted to be lowered into a well over a fish, a plurality of cutters pivotally mounted within the body adapted to be swung downwardly and inwardly into cutting engagement with the fish, means normally holding the cutters in retracted positions against the sides of the body, a sleeve slidable in the body and serving when forced downwardly to force the cutters inwardly, and means for forming at least a partial closure between said sleeve and the fish whereby when fluid is forced downwardly through the body said closure will force the sleeve into cutter projecting position.

4. In a tool of the class described, a tubular body, a cutter actuated sleeve slidable within the body and a plurality of closure-forming elements hingedly mounted upon the sleeve, said closure-forming element being in the form of conical segments adapted to mutually cooperate to form at least a partial closure about a fish within the body.

5. In a tool of the class described, a tubular body adapted to be lowered into a well, an arm pivotally mounted upon said body for lateral swinging movement relatively thereto, a flapper pivotally mounted on the interior of the body adjacent the side wall thereof arranged to be encountered by fluid forced downwardly through the body or to be swung upwardly to a position lying adjacent the walls of the body to leave the interior of the body largely unobstructed to the entry of a fish therein, and means operable by the downward swinging movement of the flapper for forcing the arm to swing laterally relatively to the body.

6. In a tool of the class described, a tubular body adapted to be lowered into a well, an arm pivotally mounted upon said body for lateral swinging movement relatively thereto, a flapper pivotally mounted on the interior of the body adjacent the side wall thereof arranged to be encountered by fluid forced downwardly through the body or to be swung upwardly to a position lying adjacent the walls of the body to leave the interior of the body largely unobstructed to the entry of a fish therein, and a lever pivotally mounted upon the body engageable with the arm and by the flapper when the flapper is forced downwardly, said lever being adapted to swing the arm laterally relatively to the body when the flapper is forced downwardly.

7. In a tool of the class described, a tubular body adapted to be lowered into a well, an arm pivotally mounted upon said body for lateral swinging movement relatively thereto, a flapper pivotally mounted on the interior of the body adjacent the side wall thereof arranged to be encountered by fluid forced downwardly through the body or to be swung upwardly to a position lying adjacent the walls of the body to leave the interior of the body largely unobstructed to the entry of a fish therein, and a lever pivotally mounted upon the body engageable with the arm and by the flapper when the flapper is forced downwardly, said lever being adapted to swing the arm laterally relatively to the body when the flapper is forced downwardly, there being a lost motion between the crank and the flapper as and for the purpose described.

8. In a tool of the class described, a tubular body adapted to be lowered into a well, an arm pivotally mounted upon the body for lateral swinging movement relatively thereto, means operable by the flow of fluid downwardly through the body for swinging the arm laterally, said means being arranged to assume a position adjacent the walls of the body when forced thereto by a fish entering the body to leave the interior of the body substantially unobstructed, and cut-off means in the body above said means having a hydraulically actuated means which is normally open for the downward flow of fluid through th ebody to actuate the arm or arranged to be substantially closed by a fish entering therethrough so as to be then actuated by the fluid to cut off the fish.

9. In a tool of the class described, a tubular body adapted to be lowered into a well, an arm pivotally mounted thereon for swinging movement relatively thereto, means movable to and out of the path of fluid forced downwardly through the body adapted to be actuated thereby to swing the arm relative to the body or to be moved out of the path by the entry of a fish into the body, cutters mounted in the body above said means adapted when actuated to engage and cut the fish, and means for actuating the cutters normally open to the passage of fluid therethrough but adapted to cooperate with a fish extending therethrough to form a piston upon which downward pressure of the fluid is effective.

10. In a tool of the class described, a tubular body adapted to be lowered into a well, an arm pivotally mounted thereon for swinging movement relatively thereto, means movable to and out of the path of fluid forced downwardly through the body adapted to be actuated thereby to swing the arm relative to the body or to be moved out of the path by the entry of a fish into the body, cutters mounted in the body above said means, means normally holding the cutters in inoperative position, a sleeve slidable in the body adapted when forced downwardly to project the cutters inwardly, and means on the sleeve adapted to permit a fish to pass upwardly therethrough and cooperable therewith to form a closure thereabouts on which pressure of the fluid may be effective to force the sleeve downwardly and thus actuate the cutters.

11. In a tool of the class described, a tubular body adapted to be lowered into a well, an arm pivotally mounted thereon for swinging movement relatively thereto, means movable to and out of the path of fluid forced downwardly through the body adapted to be actuated thereby to swing the arm relative to the body or to be moved out of the path by the entry of a fish into the body, cutters mounted in the body above said means adapted to be projected inwardly to engage and cut a fish when the body is rotated, and means for projecting the cutters inwardly to engage the fish.

12. In a tool of the class described, a tubular body adapted to be lowered into a well, an arm pivotally mounted thereon for swinging movement relatively thereto, means movable to and out of the path of fluid forced downwardly through the body adapted to be actuated thereby to swing the arm relative to the body or to be moved out of the path by the entry of a fish into the body, cutters mounted in the body above said means adapted to be projected inwardly to engage and cut a fish when the body is rotated, and means for projecting the cutters inwardly to engage the fish comprising a sleeve in the body engageable with the cutters, and frusto-conical segments pivotally mounted upon the upper end of the sleeve adapted to permit the passage of a fish therethrough and to cooperate therewith to form a closure thereabouts on which downward pressure of fluid through the body may be effective to force the sleeve downwardly, said segments when a fish is not disposed therebetween leaving the interior of the body open for the downward flow of circulation fluid without depressing the sleeve.

CLARENCE P. YOUNG.

REFERENCES CITED

The following references are of record in the file of this patent:

UNITED STATES PATENTS

| Number | Name | Date |
|---|---|---|
| 1,594,668 | Gates et al. | Aug. 3, 1926 |
| 1,696,378 | Brauer | Dec. 25, 1928 |
| 1,800,490 | Young | Apr. 14, 1938 |
| 2,175,622 | Ventresca | Oct. 10, 1939 |
| 2,285,213 | Le Bus | June 2, 1942 |
| 2,398,981 | Waggener | Apr. 23, 1946 |